US009969430B2

(12) United States Patent
Niemz

(10) Patent No.: US 9,969,430 B2
(45) Date of Patent: May 15, 2018

(54) METHOD AND DEVICE FOR ASSISTING A DRIVER OF A VEHICLE WHEN DRIVING ONTO A CARRIAGEWAY VIA AN APPROACH ROAD

(71) Applicant: Robert Bosch GmbH, Stuttgart (DE)

(72) Inventor: Volker Niemz, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days. days.

(21) Appl. No.: 15/516,304

(22) PCT Filed: Jul. 28, 2015

(86) PCT No.: PCT/EP2015/067269
§ 371 (c)(1),
(2) Date: Mar. 31, 2017

(87) PCT Pub. No.: WO2016/055183
PCT Pub. Date: Apr. 14, 2016

(65) Prior Publication Data
US 2017/0297622 A1    Oct. 19, 2017

(30) Foreign Application Priority Data

Oct. 9, 2014 (DE) ........................ 10 2014 220 496

(51) Int. Cl.
*G08G 1/09* (2006.01)
*B62D 15/02* (2006.01)
*G08G 1/16* (2006.01)
*G08G 1/0967* (2006.01)

(52) U.S. Cl.
CPC ......... *B62D 15/029* (2013.01); *G08G 1/0967* (2013.01); *G08G 1/166* (2013.01); *G08G 1/167* (2013.01)

(58) Field of Classification Search
CPC .... B62D 15/029; G08G 1/0967; G08G 1/166; G08G 1/167
USPC .................................. 340/901, 905
See application file for complete search history.

(56) References Cited

U.S. PATENT DOCUMENTS

| 6,011,492 A * | 1/2000 | Garesche ............. G08G 1/0965 340/901 |
| 2003/0043059 A1* | 3/2003 | Miller, Jr. .............. G01C 21/26 340/901 |
| 2007/0032943 A1* | 2/2007 | Okabe ................. B60T 8/17558 701/532 |

(Continued)

FOREIGN PATENT DOCUMENTS

| DE | 102006036310 A1 | 2/2007 |
| EP | 2085945 A1 | 8/2009 |
| WO | 2007026242 A1 | 3/2007 |

OTHER PUBLICATIONS

International Search Report for PCT/EP2015/067269 dated Oct. 30, 2015.

*Primary Examiner* — Eric M Blount
(74) *Attorney, Agent, or Firm* — Norton Rose Fulbright US LLP; Gerard Messina

(57) ABSTRACT

A method for supporting a driver of a vehicle when approaching a roadway via an approach road. First, an item of information concerning a course of the approach road is read in. Then, using the item of information concerning the course of the roadway, an activation signal is provided for the activation of a driver assistance function.

10 Claims, 3 Drawing Sheets

(56) References Cited

U.S. PATENT DOCUMENTS

| | | | |
|---|---|---|---|
| 2007/0188348 A1* | 8/2007 | Bauer | G08G 1/162 340/905 |
| 2008/0221767 A1* | 9/2008 | Ikeda | B60W 10/06 701/70 |
| 2010/0088024 A1* | 4/2010 | Takahara | B60W 40/072 701/532 |
| 2013/0099911 A1* | 4/2013 | Mudalige | G08G 1/163 340/438 |
| 2013/0173232 A1* | 7/2013 | Meis | G06K 9/00798 703/2 |
| 2014/0257686 A1* | 9/2014 | Feldman | G06F 17/00 701/300 |

* cited by examiner

METHOD AND DEVICE FOR ASSISTING A DRIVER OF A VEHICLE WHEN DRIVING ONTO A CARRIAGEWAY VIA AN APPROACH ROAD

FIELD OF THE INVENTION

The present invention relates to a method for supporting a driver of a vehicle when approaching a roadway via an approach road, to a corresponding device, to a vehicle, and to a corresponding computer program.

BACKGROUND INFORMATION

Conventional navigation systems can use data from corresponding maps or information about roadway lane properties, such as the length of a lane, for the navigation of a vehicle.

In order to recognize lanes and boundaries, a vehicle can be equipped with a lane departure warning system. For this purpose, an environment in front of the vehicle can be acquired for example by a front camera integrated in a rearview mirror of the vehicle.

As a rule, standard approach roads onto high-speed roads and highways are made up of a sufficiently long approach lane that can be used for acceleration and merging. Due to roadway routing, most approach roads have a strongly curved segment. As a result, it can be difficult to see a roadway segment situated in front of the home vehicle.

SUMMARY OF THE INVENTION

Against this background, the approach presented here provides a method for supporting a driver of the vehicle when approaching a roadway via an approach road, a device that uses this method, a vehicle, and, finally, a corresponding computer program, as recited in the main claims. Advantageous embodiments result from the respective subclaims and from the following description.

The solution presented here provides a method for supporting a driver of a vehicle when approaching a roadway via an approach road, the method including the following steps:

reading in an item of information concerning a course of the approach road; and providing an activation signal for activating a driver assistance function using the information concerning the course of the approach road.

A vehicle can here be understood as a motor vehicle such as a passenger vehicle, a truck, or a motorcycle. A roadway can for example be a highway or some other high-speed roadway. The roadway can be accessed for travel via an approach road. An approach road can be understood as a traffic lane that merges into the roadway. The approach road can have a curved course, at least in some segments. A segment of the approach road merging into the roadway can be realized for example as an acceleration lane. A driver assistance function can be understood as a function that is suitable for supporting the driver when approaching the roadway.

The solution proposed here is based on the recognition that it is possible to recognize the course of an approach lane before the driver can actually see this course. Using the recognized course, the driver can for example be warned about very short approaches or approach roads that join the existing traffic in the manner of an intersection, or can be supported during approach in some other suitable manner.

As a rule, a vehicle accelerates when driving on a curved approach area. The approach area can be curved in such a way that the driver first sees only when exiting the approach area that an approach lane following the approach area is very short or is not present. It can then be the case that the driver has to suddenly strongly brake the vehicle.

Using a method according to the solution proposed here, an approach situation in the region in front of the vehicle can be recognized for example on the basis of navigation data and sensor information from a camera-based lane recognition, and the driver can thereupon be timely warned about the approach situation. For example, the driver can be adequately informed already while driving on the approach lane.

Through such an active supporting of driving on entrances, accidents due to spontaneous braking maneuvers on entrances that have very short approach roads, or that have a stop line with a yield sign, can be avoided.

The effectiveness of the method can be increased if, according to a specific embodiment described below, when driving on the approach lane a cruise control device, or ACC, is throttled. Here, the brakes of the vehicle can also be pre-engaged.

According to a specific embodiment, the method can be provided with a step of ascertaining a geographical position of the vehicle. In the step of providing, the activation signal is provided if in the ascertaining step it is ascertained that the vehicle is driving on the approach road. Using the geographical position of the vehicle, it can be determined very easily when the driver is driving on the approach road. Advantageously, for the ascertaining of the geographical position a navigation device already present in the vehicle, or a mobile navigation device, can for example be used. In this way, the driver can be timely supported when driving on the approach road.

It is advantageous if, in the step of reading in, an item of information is read in concerning a merging segment of the approach road that merges onto the roadway. Here, in the step of provision, the activation signal can be provided if the information represents a merging segment that is less than a prespecified minimum length. In addition, in the step of providing the activation signal can be provided if the information additionally or alternatively represents a merging segment having at least one stopping signal. A merging segment can be understood in general as a transition area from the approach road into the roadway. The merging segment can for example be an acceleration lane or an entrance to an intersection. Depending on the specific embodiment, the prespecified minimum length can for example be between 100 and 250 meters. A stopping signal can be a sign instructing the driver to stop, such as a yield sign, a stop line, or a light signal. Through this specific embodiment, the supporting of the driver can take place as a function of a length of the approach road. Advantageously, the supporting can already take place if the approach road has a stopping signal, independently of the length of the approach road. In this way, the driver can be supported as timely as possible in accordance with the particular characteristics of the approach road.

It is in addition advantageous if in the step of reading in an item of information is read in concerning a curved segment of the approach road going over into the merging segment, and in the provision step, the activation signal is provided if in the step of ascertaining it has been ascertained that the vehicle is traveling on the curved segment. A curved segment can be understood as a curve. In particular, the curved segment can be such that when driving on the curved segment the driver cannot see, or at least can only partly see, an end of the curved segment or the merging segment following the curved segment. By providing the activation signal already while traveling on the curved segment, despite the lack, or difficulty, of visibility of the merging segment suitable measures can be timely taken in order to avoid an abrupt braking of the vehicle.

According to a further specific embodiment, in the step of reading in an item of information can be read in concerning the curve of the approach road, provided by an environmental acquisition device of the vehicle and, alternatively or in addition, a navigation device. An environmental acquisition device can for example be a camera installed in the vehicle. A navigation device can be understood as a device for satellite-based navigation of the vehicle. The navigation device can be fashioned to ascertain a geographical position or length of the approach road, for example on the basis of map data that are stored or that can be accessed wirelessly. The navigation device can be a device integrated in the vehicle, or can be a mobile navigation device. This also includes a GPS-capable smartphone having a suitable navigation app. Through the use of the environmental acquisition device, or the navigation device, which in most cases are already present in the vehicle, the information can be provided with only a small additional outlay.

In the step of provision, the activation signal can be provided in order to output a warning signal to the driver. The activation signal can in addition be provided in order, alternatively or in addition, to modify a speed or braking readiness of the vehicle, or both. The warning signal can for example be a signal tone or a warning sign or a combination of the two. Through the warning signal, the driver can be made aware of an impending approach situation. Through these measures, it is possible with a relatively low outlay to reduce the potential for accidents in the region of the approach road.

The method can in addition have a step of reducing the speed of the vehicle and, alternatively or in addition, increasing the braking readiness of the vehicle, using the activation signal. For example, the speed can be reduced using a cruise control of the vehicle. The braking readiness can be increased for example by a pre-engagement of the brakes of the vehicle, so that in the case of a braking a maximum brake power is available independently of how strongly the driver actuates the brake pedal. Through this specific embodiment, it is ensured that the vehicle timely comes to a stop when braking on the approach road, or that the driver has to brake less strongly in order to timely come to a stop.

Also advantageous is a computer program product or computer program having program code that can be stored on a machine-readable bearer or storage medium such as a semiconductor memory, a hard disk memory, or an optical memory, and that is used to carry out, realize, and/or control the steps of the method according to one of the specific embodiments described above, in particular if the program product or program is executed on a computer or on a device.

In addition, the solution presented here provides a device that is fashioned to carry out, control, or realize the steps of a variant of a method presented here in corresponding devices.

Through this variant embodiment of the present invention in the form of a device as well, the object of the present invention can be achieved quickly and efficiently.

In the present context, a device can be understood as an electrical apparatus that processes sensor signals and outputs control and/or data signals as a function thereof. The device can have an interface that can be realized as hardware and/or as software. In the case of a realization as hardware, the interfaces can for example be part of a so-called system ASIC containing a wide variety of functions of the device. However, it is also possible for the interfaces to be separate integrated circuits, or to be made up at least partly of discrete components. In the case of a realization as software, the interfaces can be software modules present for example on a microcontroller alongside other software modules.

Finally, the solution presented here provides a vehicle having the following features:

a device according to a specific embodiment described here; and an environmental acquisition device and/or a navigation device, the environmental acquisition device and/or the navigation device being fashioned to provide the information to the device concerning the course of the approach road.

The approach presented here is explained in more detail below in exemplary fashion on the basis of the accompanying drawings.

In the following description of advantageous exemplary embodiments of the present invention, identical or similar reference characters are used for the elements shown in the various Figures having similar function, without providing repeated description of these elements.

DETAILED DESCRIPTION

Figure 1A:
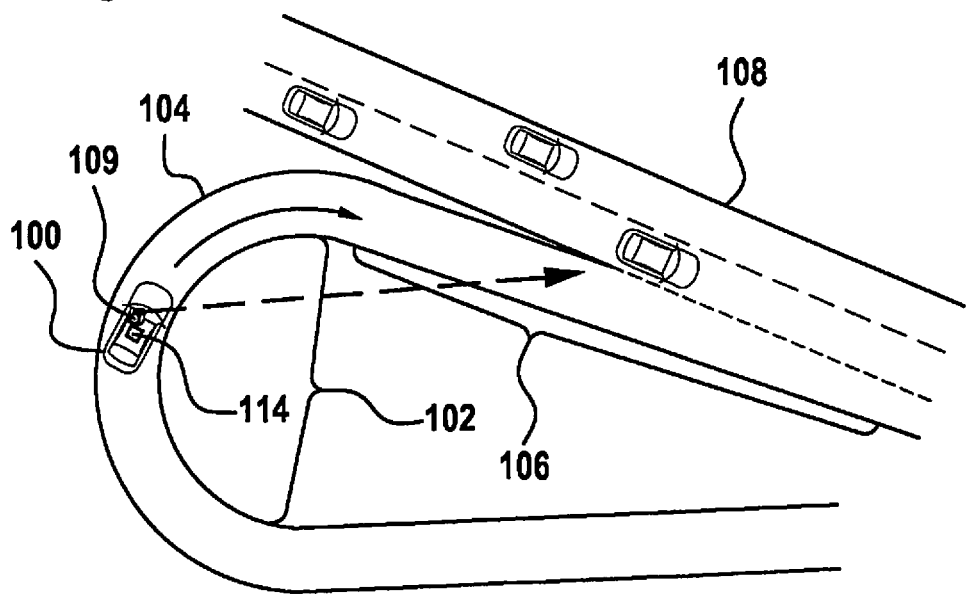
FIGS. 1a and 1b show schematic representations of various approach situations including a vehicle, according to an exemplary embodiment of the present invention.
Figure 1B:
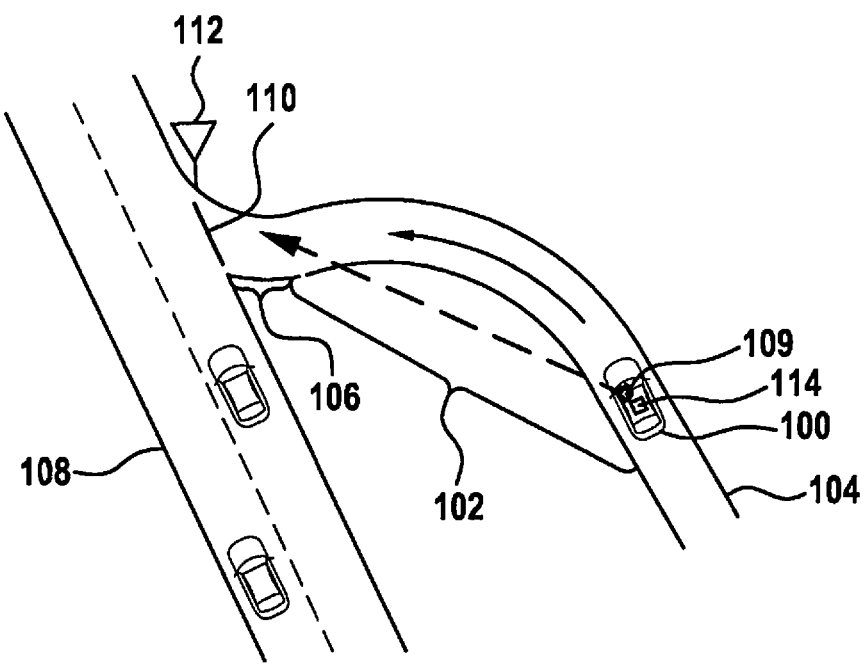

FIGS. 1a and 1b show schematic representations of various approach situations including a vehicle 100 according to an exemplary embodiment of the present invention. In the two FIGS. 1a and 1b, in each case vehicle 100 is traveling on a curved segment 102 of an approach road 104 that, in a merging segment 106, merges into a roadway 108. Vehicle 100 is moving towards merging segment 106. Roadway 108 is connected with a further roadway (not shown) via merging segment 106 and curved segment 102, which goes over into merging segment 106. Curved segment 102 is in each case curved in such a way that a driver 109 of vehicle 100 cannot see, or at least cannot completely see, the end of curved segment 102, or merging segment 106, while driving on curved segment 102. A direction of view of driver 109 is marked with a dashed arrow.

In FIG. 1a, merging segment 106 is an acceleration lane that runs essentially parallel to roadway 108, here a two-lane high-speed roadway, and enables an approach to a right lane of roadway 108 along a dashed roadway marking. Curved segment 102 is shown as a long curve. Merely as an example, the curve angle of curved segment 102 is approximately 180°.

In FIG. 1b, merging segment 106 is significantly shorter than in FIG. 1a. In addition, merging segment 106 does not go over gradually into roadway 108, as in FIG. 1a, but rather intersects it, as an example, approximately at a right angle. Here as well, roadway 108 is shown as a two-lane high-speed roadway. Merging segment 106 has, in a stopping region merging into roadway 108, a stop line 110 and a yield sign 112 as stopping signals. Curved segment 102 is significantly less curved than in FIG. 1a. Merely as an example, the curve angle of curved segment 102 is approximately 90°.

Vehicle 100 has a device 114 that is fashioned to receive an item of information concerning a curve of approach road 104 and, as a function of the information, to activate a driver assistance function that supports driver 109 when approaching roadway 108 via approach road 104.

According to this exemplary embodiment, the information represents a respective length of merging segment 106 shown in FIGS. 1a and 1b. Device 114 is fashioned to activate the driver assistance function when the respective length of merging segment 106 is less than a prespecified minimum length. For example, the minimum length can be between 200 and 250 meters.

Device 114 is in addition fashioned to activate the driver assistance function already when vehicle 100 is still on curved segment 102; i.e., the driver assistance function is activated before vehicle 100 enters merging segment 106. Through the activation, a warning signal can be outputted to driver 109, a speed of vehicle 100 can be changed, or a braking force of vehicle 100 can be regulated. Depending on the specific embodiment, these driver assistance functions can be activated individually or in combination.

In FIG. 1b, in which merging segment 106 is an intersection entrance, merging segment 106 is significantly shorter than the minimum length. For example, merging segment 106 is only between 20 and 50 meters long. According to this exemplary embodiment, device 114 is fashioned to receive an additional item of information about the presence of a stopping signal, here stop line 110 and yield sign 112, and to activate the driver assistance function as a function of the presence of the stopping signal. Here, device 114 can be fashioned to activate the driver assistance function when the stopping signal is present, independent of whether merging segment 106 has the minimum length.

In FIG. 1a, merging segment 106 is only slightly shorter than the specified minimum length. For example, merging segment 106 has a length of approximately 150 meters.

In both approach situations, the driver assistance function is activated by device 114. In this way, it is achieved that vehicle 100 is timely braked and drives through merging segment 106 with a correspondingly reduced speed. In this way, rear-end collisions can be avoided on approach road 104 that can occur when driver 109, after driving through curved segment 102, brakes with unexpectedly strong force, for example in order to timely come to a stop at the end of merging section 106.

Optionally, device 114 is fashioned to enable a timely acceleration of vehicle 100 as a function of the course of approach road 104, for example in order to reach a minimum speed required to merge onto roadway 108.

According to a further specific embodiment, device 114 is fashioned to additionally receive an item of information relating to a volume of traffic on roadway 108 and to activate the driver assistance function as a function of the volume of traffic. In this way, it can for example be prevented that driver 109, when accelerating out from curved segment 102, is surprised by a high volume of traffic on roadway 108 and abruptly brakes in merging region 106 in order to wait for a gap in the flow of traffic.

Figure 2:
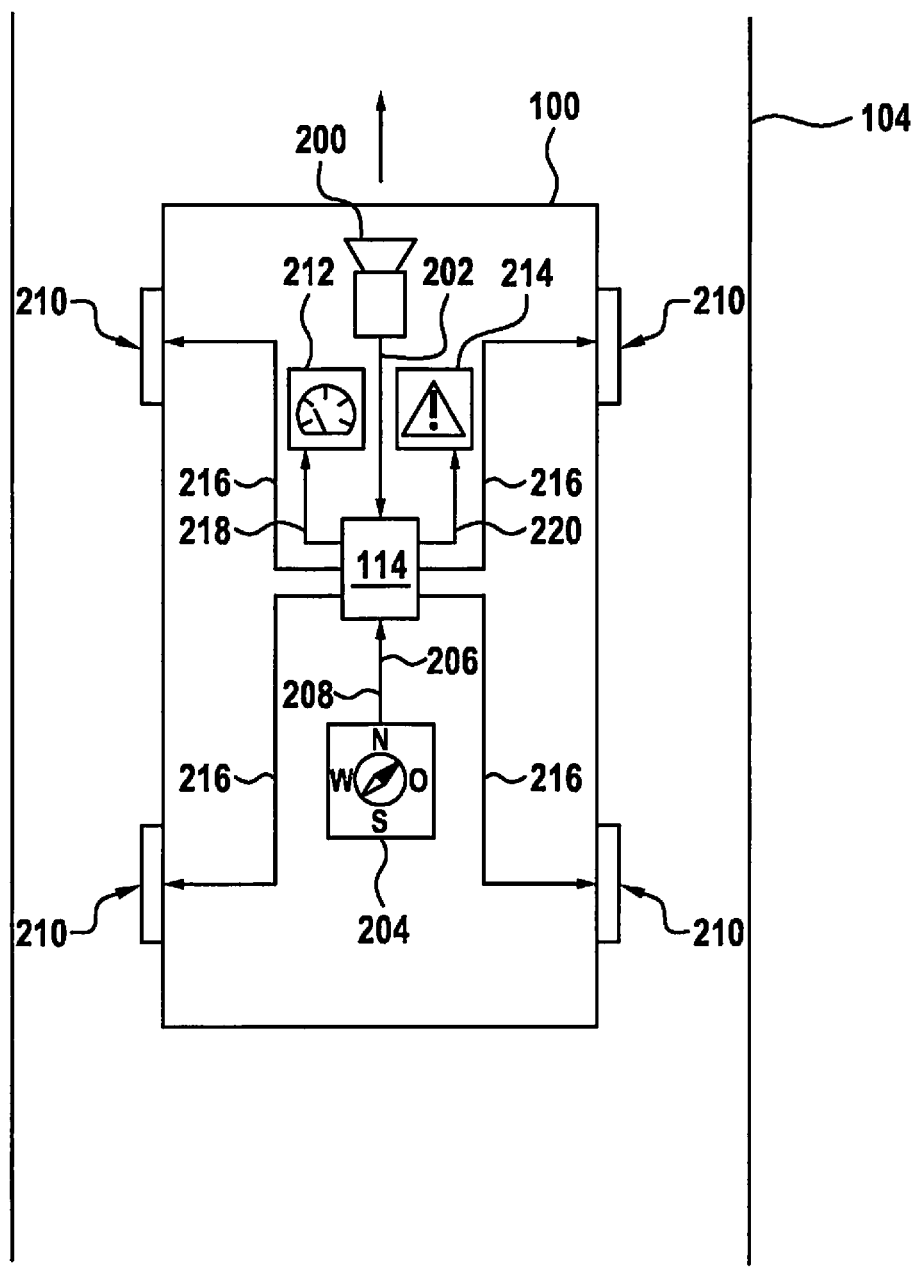
FIG. 2 shows a schematic representation of a vehicle according to an exemplary embodiment of the present invention.

FIG. 2 shows a schematic representation of a vehicle 100 according to a specific embodiment of the present invention. Vehicle 100 is for example the vehicle described on the basis of FIGS. 1a and 1b.

Vehicle 100 has, in addition to device 114, an environmental acquisition device 200. Environmental acquisition device 200, here a camera directed onto an area in front of vehicle 100, is configured to acquire the course of approach road 104. For this purpose, environmental acquisition device 200 can be realized having a lane recognition function. In addition, environmental acquisition device 200 can be fashioned to acquire stopping signals such as the yield sign and the stop line from FIG. 1b. Environmental acquisition device 200 is correspondingly fashioned to send an item of environmental information 202, representing the course of approach road 104 and the stopping signals, to device 114.

According to this exemplary embodiment, device 114 is additionally coupled with a navigation device 204. Navigation device 204 is fashioned to ascertain a geographical position of vehicle 100 on the basis of satellite-based map data, and to communicate a corresponding item of position information 206 to device 114. Navigation device 104 can also be fashioned to ascertain, in addition to environmental acquisition device 200, the course of approach road 104, such as its length, on the basis of the map data, and to send a corresponding item of navigation information 208 to device 114. In addition, navigation information 208 can contain indications of stopping signals in the region of approach road 104.

According to the exemplary embodiment shown in FIG. 2, device 114 is connected to a brake system 210, a cruise control 212, and a warning device 214 of vehicle 100. Warning device 114 is realized for example as a display panel integrated in a dashboard or steering wheel, or as a loudspeaker in vehicle 100. Device 114 is fashioned to send, using environmental information 202 and navigation information 208, a brake signal 216 to brake system 210 in order to change a braking readiness of vehicle 100, to send a speed signal 218 to cruise control 212 in order to change a speed of vehicle 100, and to send a warning signal 220 to warning device 214 in order to output an acoustic, optical, or haptic warning signal. Braking signal 216, speed signal 218, and warning signal 220 can also be designated activation signals. Device 114 is configured to output activation signals 216, 218, 220 only when position information 206 represents a geographical position of vehicle 100 on approach road 104, in particular on the curved segment of approach road 104.

For example, the braking readiness of vehicle 100 in approach situations, as shown in FIGS. 1a and 1b, can be correspondingly increased via brake signal 216 by pre-engaging the brakes. Alternatively or in addition, through speed signal 212 the speed of vehicle 100 can be regulated downward.

Figure 3:
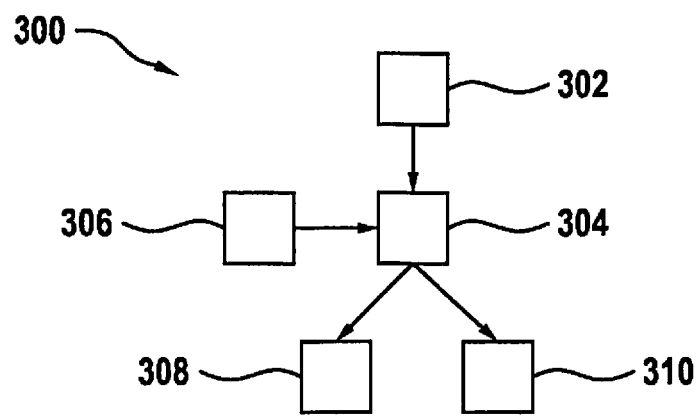
FIG. 3 shows a flow diagram of a method according to an exemplary embodiment of the present invention.

FIG. 3 shows a flow diagram of a method 300 according to an exemplary embodiment of the present invention. In method 300 for supporting a driver of a vehicle when approaching a roadway via an approach road, in a step 302 first an item of information is read in concerning a course of the approach road. Then, in a step 304, an activation signal is provided for activating a driver assistance function, using the item of information concerning the course of the approach road.

According to an exemplary embodiment, in a step 306 a geographical position of the vehicle is ascertained. Depending on the specific embodiment, using the geographical position, in step 304 the activation signal can be provided as soon as the vehicle is on the approach road or is on a curved segment of the approach road.

According to a further exemplary embodiment, in a step 308 the braking readiness of the vehicle is increased using the activation signal. Alternatively or in addition, in a step 310 the speed of the vehicle is reduced.

Figure 4:
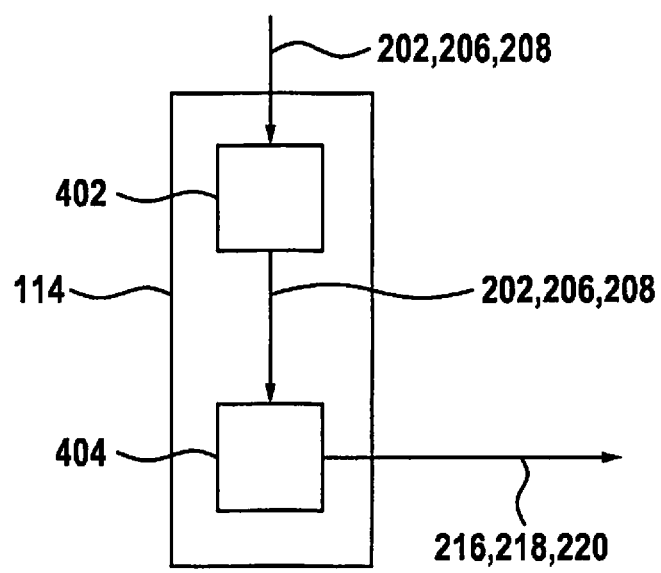
FIG. 4 shows a schematic diagram of a device for carrying out a method according to an exemplary embodiment of the present invention.

FIG. 4 shows a schematic diagram of a device 114 for carrying out a method according to an exemplary embodiment of the present invention. Device 114 shown in FIG. 4 for supporting a driver of a vehicle when approaching a roadway via an approach road is for example the device described on the basis of FIGS. 1a through 2. Device 114 can be fashioned to carry out a method described on the basis of FIG. 3.

Device 114 has a read-in unit 402 for reading in an item of information concerning the course of the approach road. For example, read-in unit 402 can be connected, via suitable interfaces, to an environmental acquisition device and to a navigation device of FIG. 2, in order to read in environmental information 202 and navigation information 208.

Read-in unit 402 is coupled to a provision unit 404 that is fashioned to provide, using the information concerning the course of the approach road, an activation signal for activating a driver assistance function. Depending on the specific embodiment, provision unit 404 can be connected, either directly or via corresponding control devices, to a brake system, to a cruise control, or to a warning device of FIG. 2, and can be fashioned to provide activation signals 216, 218, 220 using information 202, 208.

According to this exemplary embodiment, read-in unit 402 is fashioned to additionally receive, from the navigation device, the item of position information 206 concerning the geographical position of the vehicle, and to forward it to provision unit 404. Correspondingly, provision unit 404 is fashioned to provide activation signals 216, 218, 220, using position information 206, as a function of the geographical position of the vehicle.

The exemplary embodiments described and shown in the Figures have been chosen only as examples. Different exemplary embodiments can be combined with one another in their entirety or with regard to individual features. An exemplary embodiment can also be supplemented with features of a further exemplary embodiment.

In addition, the method steps presented here can be repeated, and can be carried out in a sequence differing from that described.

If an exemplary embodiment includes an "and/or" linkage between a first feature and a second feature, this is to be read as meaning that according to one specific embodiment the exemplary embodiment has both the first feature and also the second feature, and according to a further specific embodiment the exemplary embodiment has either only the first feature or only the second feature.

What is claimed is:

1. A method for supporting a driver of a vehicle when approaching a roadway via an approach road, the method comprising:
   reading in an item of information concerning a course of the approach road;
   ascertaining the vehicle is traveling on the approach road;
   receiving information regarding a volume of traffic on the roadway which the vehicle is approaching via the approach road; and
   providing an activation signal for activating a driver assistance function using the item of information concerning the course of the approach road and as a function of volume of traffic on the roadway, the driver assistance function being activated as a function of the course of the approach road and as a function of the volume of traffic on the roadway, and based on the ascertainment that the vehicle is traveling on the approach road.

2. The method of claim 1, wherein, in the reading in, an item of information is read in concerning a merging segment, merging into the roadway, of the approach road, the activation signal being provided in the providing if the item of information represents a merging segment that is less than a prespecified minimum length and/or that has at least one stopping signal.

3. The method of claim 1, wherein in the reading in an item of information is read in concerning a curved segment of the approach road that goes over into the merging segment, the activation signal being provided in the providing if it is ascertained in the ascertaining that the vehicle is traveling on the curved segment.

4. The method of claim 1, wherein in the reading in an item of information concerning the course of the approach road, provided by an environmental acquisition device of the vehicle and/or by a navigation device, is read in.

5. The method of claim 1, wherein in the providing the activation signal is provided to output a warning signal to the driver and/or to change a speed of the vehicle and/or to change a braking readiness of the vehicle.

6. The method of claim 5, further comprising:
   reducing a speed of the vehicle and/or of increasing the braking readiness of the vehicle, using the activation signal.

7. A non-transitory computer readable medium having a computer program, which is executable by a processor, comprising:
   a program code arrangement having program code for supporting a driver of a vehicle when approaching a roadway via an approach road, by performing the following:
      reading in an item of information concerning a course of the approach road;
      ascertaining the vehicle is traveling on the approach road;
      receiving information regarding a volume of traffic on the roadway which the vehicle is approaching via the approach road; and
      providing an activation signal for activating a driver assistance function using the item of information concerning the course of the approach road and as a function of volume of traffic on the roadway, the driver assistance function being activated as a function of the course of the approach road and as a function of the volume of traffic on the roadway, and based on the ascertainment that the vehicle is traveling on the approach road.

8. A device for supporting a driver of a vehicle when approaching a roadway via an approach road, comprising:
   a read-in unit for reading in an item of information concerning a course of the approach road;
   a navigation device to ascertain the vehicle is traveling on the approach road;
   a device to receive information regarding a volume of traffic on the roadway which the vehicle is approaching via the approach road; and
   a provision unit for providing an activation signal for activating a driver assistance function using the item of information concerning the course of the approach road and as a function of volume of traffic on the roadway, the driver assistance function being activated as a function of the course of the approach road and as a function of the volume of traffic on the roadway, and based on the ascertainment that the vehicle is traveling on the approach road.

9. A vehicle, comprising:
   a device for supporting a driver of a vehicle when approaching a roadway via an approach road, including:
   a read-in unit for reading in an item of information concerning a course of the approach road;
   a navigation device to ascertain the vehicle is traveling on the approach road;
   a device to receive information regarding a volume of traffic on the roadway which the vehicle is approaching via the approach road; and
   a provision unit for providing an activation signal for activating a driver assistance function using the item of information concerning the course of the approach road and as a function of volume of traffic on the roadway, the driver assistance function being activated as a function of the course of the approach road and as a function of the volume of traffic on the roadway, and based on the ascertainment that the vehicle is traveling on the approach road; and
   an environmental acquisition device and/or a navigation device, the environmental acquisition device and/or the navigation device being configured to provide the item of information concerning the course of the approach road to the device.

10. The method as recited in claim 1, wherein the driver assistance function that is activated is at least one of: (i) a change of a speed of the vehicle using a cruise control of the vehicle, and (ii) a change in a braking readiness of the vehicle using a brake system of the vehicle.

\* \* \* \* \*